(12) United States Patent
Campbell et al.

(10) Patent No.: US 6,366,883 B1
(45) Date of Patent: Apr. 2, 2002

(54) CONCATENATION OF SPEECH SEGMENTS BY USE OF A SPEECH SYNTHESIZER

(75) Inventors: Nick Campbell, Nara (JP); Andrew Hunt, Medford, MA (US)

(73) Assignee: ATR Interpreting Telecommunications, Kyoto (JP)

( * ) Notice: Subject to any disclaimer, the term of this patent is extended or adjusted under 35 U.S.C. 154(b) by 0 days.

(21) Appl. No.: 09/250,405

(22) Filed: Feb. 16, 1999

Related U.S. Application Data

(63) Continuation-in-part of application No. 08/856,578, filed on May 15, 1997, now abandoned.

(30) Foreign Application Priority Data

May 15, 1996 (JP) .............................................. 8-120113

(51) Int. Cl.[7] .............................................. G10L 13/08
(52) U.S. Cl. ........................ 704/260; 704/258; 704/267
(58) Field of Search ................................ 704/232, 258, 704/260, 267

(56) References Cited

U.S. PATENT DOCUMENTS 5,459,815 A 10/1995 Aikawa et al.

FOREIGN PATENT DOCUMENTS

EP 0674307 A2 9/1995

OTHER PUBLICATIONS

John R. Deller, et al. Discrete–Time Processing of Speech Signals, Prentice–Hall, 1987, p. 385 and 841–842.*

Y. Sagisaka, Speech synthesis by rule using an optimal selection of non–uniform synthesis units, Acoustics, Speech, and Signal Processing, 1988, ICASSP–88., 1988 International Conference on, New York, NY, USA, 1988, pp. 679–682, vol. 1.

T. Hirokawa, Speech Synthesis using a Waveform Dictionary–European Conference on Speech Communication and Technology, p. 140–143 (1989).

T. Hirokawa, et al. Segment Selection 2nd Pitch Modification, Proc. ICSLP–90, 337–340 (1990).

N. Iwahashi et al, IEEE, Acoustics, Speech, and Signal Processing, 1992. ICASSP–92, vol. 2, pp. 65–68.

Y. Sagisaka, Speech, Image Processing and Neutral Networks, 1994. Proceedings, ISSIPNN '94., 1994 International Symposium on, New York, NY, USA, 1994, p. 146–150, vol. 1.

A. J. Hunt et al, ICASSP–96 Japan, pps. 373–376 (1996).

John R. Deller, et al., Discrete–Time Processing of Speech Signals, Prentice–Hall, 1987, pp. 837–839.

* cited by examiner

*Primary Examiner*—Talivaldis Ivars Šmits

(57) ABSTRACT

In a speech synthesizer apparatus, a weighting coefficient training controller calculates acoustic distances in second acoustic feature parameters between one target phoneme from the same phoneme and the phoneme candidates other than the target phoneme based on first acoustic feature parameters and prosodic feature parameters, and determines weighting coefficient vectors for respective target phonemes defining degrees of contribution to the second acoustic feature parameters for respective phoneme candidates by executing a predetermined statistical analysis therefor. Then, a speech unit selector searches for a combination of phoneme candidates which correspond to a phoneme sequence of an input sentence and which minimizes a cost including a target cost representing approximate costs between a target phoneme and the phoneme candidates and a concatenation cost representing approximate costs between two phoneme candidates to be adjacently concatenated, and outputs index information on the searched out combination of phoneme candidates. Further, a speech synthesizer synthesizes a speech signal corresponding to the input phoneme sequence by sequentially reading out speech segments of speech waveform signals corresponding to the index information and concatenating the read speech segments of the speech waveform signals.

23 Claims, 11 Drawing Sheets

Definition of Speech Unit Selection Cost

CONCATENATION OF SPEECH SEGMENTS BY USE OF A SPEECH SYNTHESIZER

This application is a continuation-in-part of application Ser. No. 08/856,578 filed on May 15, 1997 now abandoned, the entire contents of which are hereby incorporated by reference.

BACKGROUND OF THE INVENTION

1. Field of the Invention

The present invention relates to a speech synthesizer apparatus, and in particular, to a speech synthesizer apparatus for performing speech synthesis of any arbitrary sequence of phonemes by concatenation of speech segments of speech waveform signals extracted at synthesis time from a natural utterance.

2. Description of the Prior Art

FIG. 2 is a block diagram of a conventional speech synthesizer apparatus.

Referring to FIG. 2, for example, LPC analysis is executed on signal waveform signal data of a speaker for training, and then acoustic feature parameters including 16-degree cepstrum coefficients are extracted. The extracted acoustic feature parameters are temporarily stored in a feature parameter memory 62 of a buffer memory, and then, are transferred from the feature parameter memory 62 to a parameter time sequence generator 52. Next, the parameter time sequence generator 52 executes a signal process, including a time normalization process and a parameter time sequence generation process using prosodic control rules stored in a prosodic rule memory 63, based on the extracted acoustic feature parameters, so as to generate a time sequence of parameters including, for example, the 16-degree cepstrum coefficients, which are required for speech synthesis, and output the generated time sequence thereof to a speech synthesizer 53.

The speech synthesizer 53 is a speech synthesizer apparatus which has already known to those skilled in the art, and comprises a pulse generator 53a for generating voiced speech, a noise generator 53b for generating unvoiced speech, and a filter 53c whose filter coefficient is changeable. The speech synthesizer 53 switches between voiced speech generated by the pulse generator 53a and unvoiced speech generated by the noise generator 53b based on an inputted time sequence of parameters, controls the amplitude of the voiced speech or unvoiced speech, and further changes filter coefficients corresponding to transfer coefficients of the filter 53c. Then, the speech synthesizer 53 generates and outputs a speech signal of attained speech synthesis to a loudspeaker 54, and then the speech of the speech signal is outputted from the loudspeaker 54.

However, in the conventional speech synthesizer apparatus, there has been such a problem that the quality of the resulting voice is considerably poor owing to the fact that the signal processing using the prosodic control rules is required, and to the fact that the speech synthesis is performed based on processed acoustic feature parameters.

SUMMARY OF THE INVENTION

An essential object of the present invention is therefore to provide a speech synthesizer apparatus capable of converting any arbitrary phoneme sequence into uttered speech of speech signal without using any prosodic modification rules and without executing any signal processing, and further obtaining a voice quality closer to the natural voice, as compared with that of the conventional apparatus.

In order to achieve the aforementioned objective, according to one aspect of the present invention, there is provided a speech synthesizer apparatus comprising:

first storage means for storing speech segments of speech waveform signals of natural utterance;

speech analyzing means, based on the speech segments of the speech waveform signals stored in said first storage means and a phoneme sequence corresponding to the speech waveform signals, for extracting and outputting index information on each phoneme of the speech waveform signals, first acoustic feature parameters of each phoneme indicated by the index information, and prosodic feature parameters for each phoneme indicated by the index information;

second storage means for storing the index information, the first acoustic feature parameters, and the prosodic feature parameters outputted from said speech analyzing means;

weighting coefficient training means for calculating acoustic distances in second acoustic feature parameters between one target phoneme from the same phonemic kind and the phoneme candidates other than the target phoneme based on the first acoustic feature parameters and the prosodic feature parameters which are stored in said second storage means, and for determining weighting coefficient vectors for respective target phonemes defining degrees of contribution to the second acoustic feature parameters for respective phoneme candidates by executing a predetermined statistical analysis for each of the second acoustic feature parameters for respective phoneme candidates based on the calculated acoustic distances;

third storage means for storing weighting coefficient vectors for the respective target phonemes determined by the weighting coefficient training means;

speech unit selecting means, based on the weighting coefficient vectors for the respective target phonemes stored in said third storage means, and the prosodic feature parameters stored in said second storage means, for searching for a combination of phoneme candidates which correspond to a phoneme sequence of an input sentence and which minimizes a cost including a target cost representing approximate costs between a target phoneme and the phoneme candidates and a concatenation cost representing approximate costs between two phoneme candidates to be adjacently concatenated, and for outputting index information on the searched out combination of phoneme candidates; and speech synthesizing means for synthesizing and outputting a speech signal corresponding to the input phoneme sequence by sequentially reading out speech segments of speech waveform signals corresponding to the index information from said first storage means based on the index information outputted from said speech unit selecting means, and by concatenating the read-out speech segments of the speech waveform signals.

In the above-mentioned speech synthesizer apparatus, said speech analyzing means may preferably comprise phoneme predicting means for predicting a phoneme sequence corresponding to the speech waveform signals based on input speech waveform signals.

In the above-mentioned speech synthesizer apparatus, said weighting coefficient training means may preferably determine the weighting coefficient vectors for the respective target phonemes representing the degrees of contribution to the second acoustic feature parameters for the respective phoneme candidates, by extracting a plurality of best top N1 phoneme candidates based on the calculated acoustic distances, and by executing a linear regression analysis for each of the second acoustic feature parameters.

In the above-mentioned speech synthesizer apparatus, said weighting coefficient training means may preferably determine the weighting coefficient vectors for the respective target phonemes representing the degrees of contribution to the second acoustic feature parameters for the respective phoneme candidates, by extracting a plurality of best top N1 phoneme candidates based on the calculated acoustic distances, and by executing a statistical analysis using a predetermined neural network for each of the second acoustic feature parameters.

In the above-mentioned speech synthesizer apparatus, said speech unit selecting means may preferably extract a plurality of top N2 phoneme candidates that are best in terms of the cost including the target cost and the concatenation cost, and thereafter, search for a combination of phoneme candidates that minimizes the cost.

In the above-mentioned speech synthesizer apparatus, the first acoustic feature parameters may preferably include cepstrum coefficients, delta cepstrum coefficients and phoneme labels.

In the above-mentioned speech synthesizer apparatus, the first acoustic feature parameters may preferably include formant parameters and voice source parameters.

In the above-mentioned speech synthesizer apparatus, the prosodic feature parameters may preferably include phoneme durations, speech fundamental frequencies $F_0$, and powers.

In the above-mentioned speech synthesizer apparatus, the second acoustic feature parameters may preferably include cepstral distances.

According to one aspect of the present invention, any arbitrary phoneme sequence can be converted into uttered speech without using any prosodic control rule or executing any signal processing. Still further, voice quality close to the natural one can be obtained, as compared with that of the conventional apparatus.

In another aspect of the present invention, the speech analyzing means may preferably comprise phoneme predicting means for predicting a phoneme sequence corresponding to an input speech waveform signal based on the input speech waveform signal. Accordingly, since there is no need of giving a phoneme sequence beforehand, the part of manual work can be simplified.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments according to the present invention will be described below with reference to the attached drawings.

Figure 1:
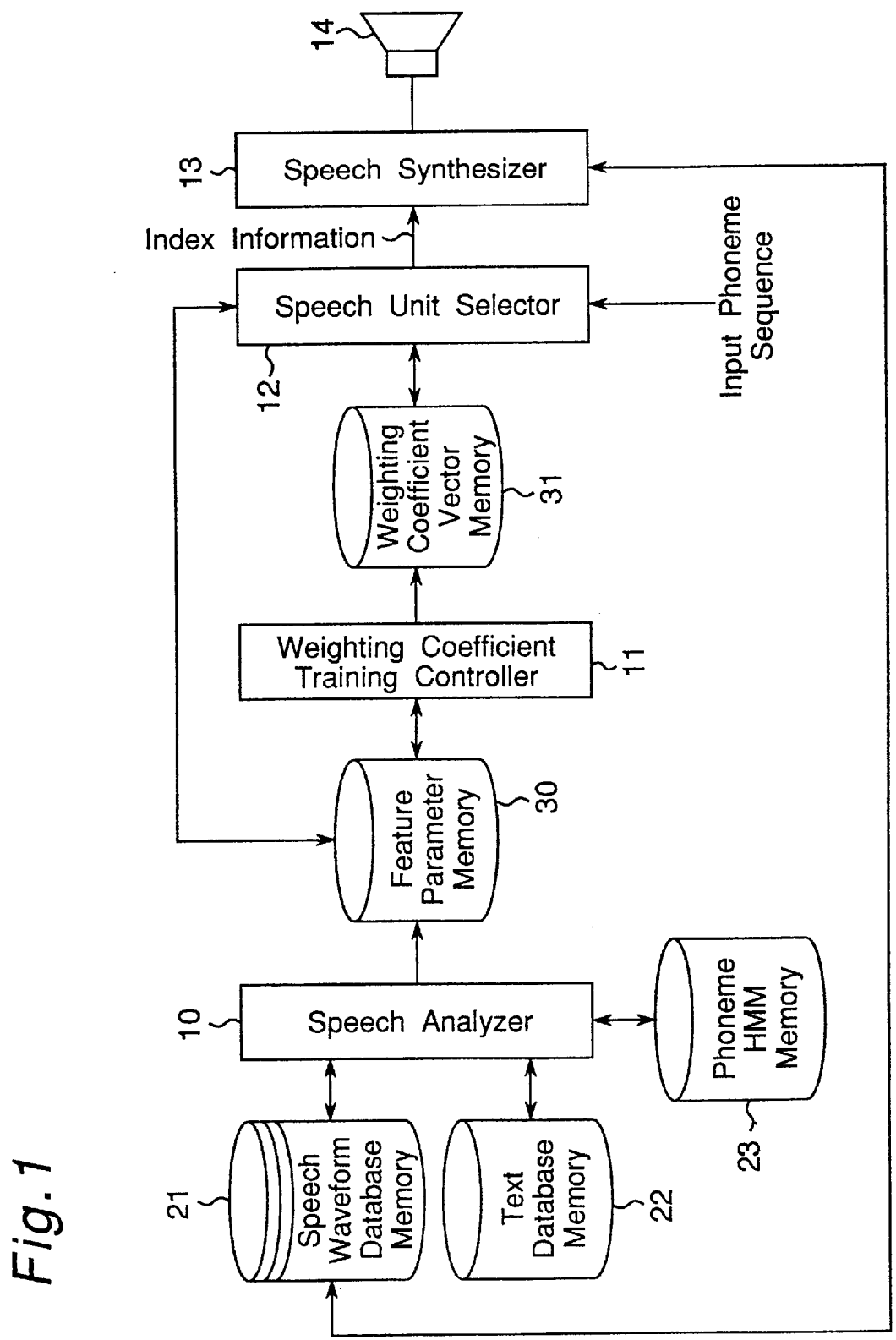
FIG. 1 is a block diagram of a speech synthesizer apparatus utilizing concatenation of speech segments of speech waveform signals of natural utterance, which is a preferred embodiment according to the present invention.
Figure 2:
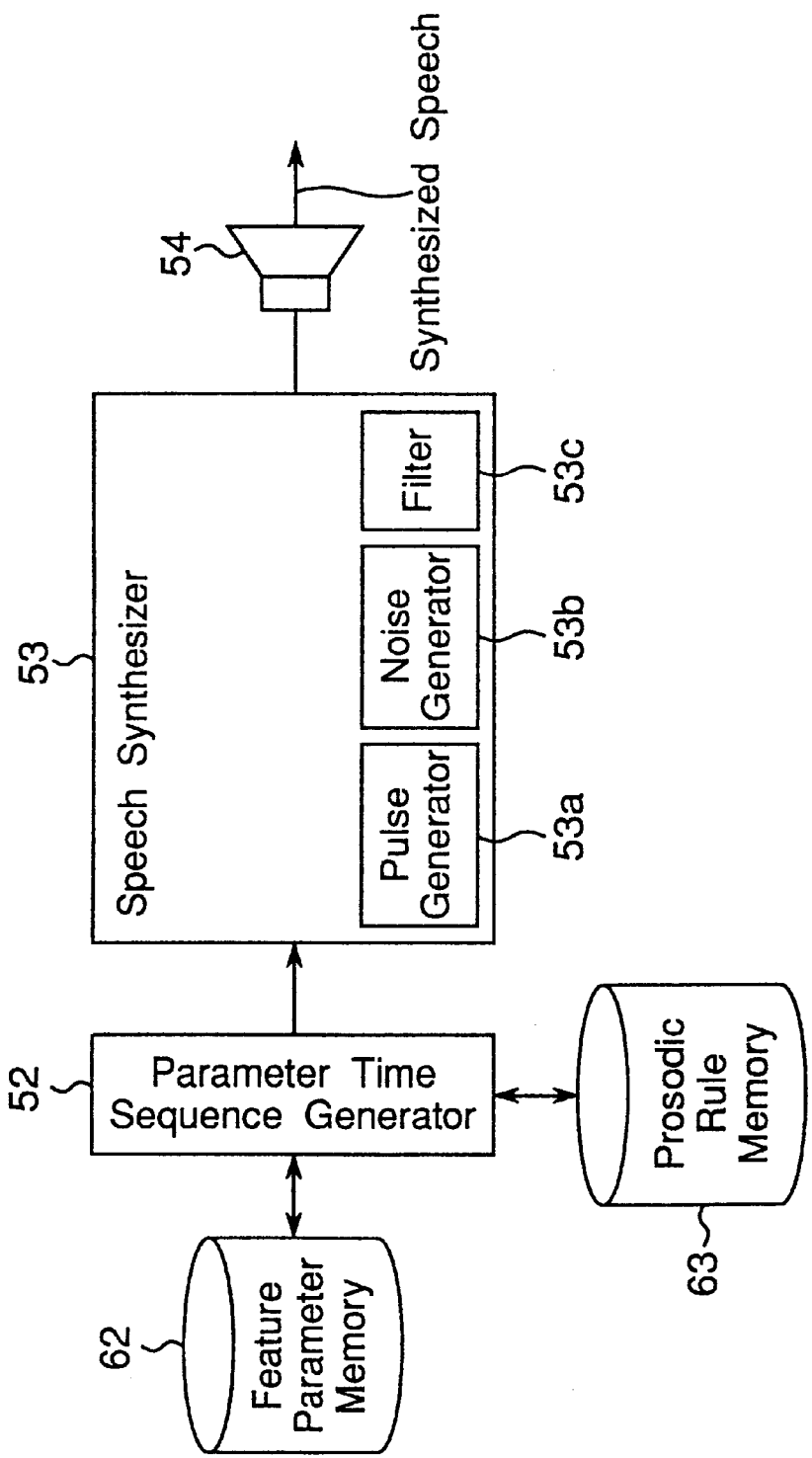
FIG. 2 is a block diagram of a conventional speech synthesizer apparatus.

FIG. 1 is a block diagram of a speech synthesizer apparatus utilizing concatenation of speech segments of speech waveform signals of natural utterance, which is a preferred embodiment according to the present invention. The conventional speech synthesizer apparatus, for example as shown in FIG. 2, performs the processes from the extraction of text corresponding to input uttered speech to the generation of a speech waveform signal, as a sequence of processes. On the other hand, the speech synthesizer apparatus of the present preferred embodiment can be roughly comprised of the following four processing units or controllers:

(1) a speech analyzer 10 for performing speech analysis of a speech waveform database stored in a speech waveform database memory 21, more specifically, a process including generation of a phonemic symbol sequence, alignment of the phonemes, and extraction of acoustic feature parameters;

(2) a weighting coefficient training controller 11 for deciding an optimal weighting coefficient through training process;

(3) a speech unit selector 12 for executing selection of a speech unit based on an input phoneme sequence and outputting index information on speech segments of speech waveform signals corresponding to the input phoneme sequence; and (4) a speech synthesizer 13 for generating speech segments of respective phoneme candidates that have been determined as the optimum ones by randomly accessing the speech waveform database stored in the speech waveform database memory 21 with skipping them and concatenation of them, based on the index information outputted from the speech unit selector 12, and for D/A converting and outputting the speech segments of the speech waveform signals to the loudspeaker 14.

Concretely speaking, based on speech segments of an input speech waveform signal of natural utterance and a phoneme sequence corresponding to the speech waveform signal, the speech analyzer 10 extracts and outputs index information for each phoneme in the speech segments of the speech waveform signal, first acoustic feature parameters for each phoneme shown by the index information, and first prosodic feature parameters for each phoneme shown by the index information. Then, a feature parameter memory 30 temporarily stores the index information outputted from the speech analyzer 10, the first acoustic feature parameters, and the first prosodic feature parameters. Next, the weighting coefficient training controller 11 calculates acoustic distances in second acoustic feature parameters between one target phoneme from the same phonemic kind and the phoneme candidates other than the target phoneme based on the first acoustic feature parameters and the prosodic feature parameters which are stored in the feature parameter memory 30, and determines weighting coefficient vectors for respective target phonemes defining degrees of contribution to the second acoustic feature parameters for respective phoneme candidates by executing a predetermined statistical analysis such as a linear regression analysis or the like for each of the second acoustic feature parameters for respective phoneme candidates based on the calculated acoustic distances. A weighting coefficient vector memory 31 temporarily stores not only the weighting coefficient vectors for the respective target phonemes in the second acoustic feature parameters determined by the weighting coefficient training controller 11, but also previously given weighting coefficient vectors for the respective target phonemes that represent the degrees of contribution to the second prosodic feature parameters for the phoneme candidates. Further, based on the weighting coefficient vectors for the respective target phonemes stored in the weighting coefficient vector memory 31 and the first prosodic feature parameters stored in the feature parameter memory 30, the speech unit selector 12 searches the phoneme sequence of an input sentence of natural utterance for a combination of phoneme candidates that minimizes the cost including a target cost representing approximate costs between target phonemes and phoneme candidates and a concatenation cost representing approximate costs between two phoneme candidates to be adjacently concatenated, and then outputs index information on the searched-out combination of phoneme candidates. Then, based on the index information outputted from the speech unit selector 12, the speech synthesizer 13 reads out speech segments of speech waveform signals corresponding to the index information from the speech waveform database memory 21 sequentially, concatenates the read-out speech segments thereof, D/A converts the concatenated speech segments of the speech waveform signal data into speech waveform signals, and outputs the D/A converted speech waveform signals to a loudspeaker 14, and then, synthesized speech of the speech waveform signals corresponding to the input phoneme sequence is outputted from the loudspeaker 14.

It is necessary to perform the process by the speech analyzer 10 necessarily once for a newly introduced speech waveform database. It is generally necessary to perform the process by the weighting coefficient training controller 11 only once, and the optimal weighting coefficients determined by the weighting coefficient training controller 11 can be also reused for different speech analysis conditions. Further, the processes by the speech unit selector 12 and the speech synthesizer 13 are executed each time the input phoneme sequence to be subjected to speech synthesis changes.

The speech synthesizer apparatus of the present preferred embodiment predicts all the feature parameters that are required according to any given level of input, and selects the samples (i.e., speech segments of phoneme candidates) closest to the features of desired speech out of the speech waveform database stored in the speech waveform database memory 21. The processing can be performed given at least a sequence of phoneme labels, however, if the phoneme fundamental frequency $F_0$ and the phoneme duration are previously given, even higher quality of synthesized speech can be obtained. In addition, when only word information is given as the input, it is necessary to predict the sequence of phonemes based on dictionaries and rules such as phonemic hidden Markov model (hereinafter, the hidden Markov model will be referred to as an HMM) or the like. Given no prosodic features, a standard prosody is generated based on known features of phonemes under various environments in the speech waveform database.

In the present preferred embodiment, if text data that orthographically describes recorded contents of the speech waveform database memory 21 is present, for example, as a text database in a text database memory 22, every speech waveform database can be used as speech segments of speech waveform signal data for synthesis. However, the quality of output speech is conditioned largely by the recorded state, the balance of phonemes in the speech waveform database, and the like. Therefore, if the speech waveform database stored in the speech waveform database memory 21 has an abundance of contents, a wider variety of speech can be synthesized. Conversely, if the speech waveform database is poor, the synthesized speech would be of more discontinuity, or more brokenness.

Next described is the phoneme labeling for speech of natural utterance. Whether or not the selection of a speech unit is appropriate depends on the labeling, as well as search method, of phonemes in the speech waveform database. In the present preferred embodiment, the speech unit is a phoneme. First of all, the contents of orthographical utterance imparted to the recorded speech are converted into a sequence of phonemes and further assigned to speech segments of speech waveform signals. Based on the result of this, the extraction of prosodic feature parameters is carried out. The input data of the speech analyzer 10 is speech segments of speech waveform signal data stored in the speech waveform database memory 21 accompanied by the representation of phonemes stored in the text database memory 22, and its output is feature vectors or feature parameters. These feature vectors serve as the fundamental units for representing speech samples or segments in the speech waveform database, and are used to select an optimal speech unit.

The first stage of the processing by the speech analyzer 10 is the transformation from orthographical text into phonemic symbols for describing how the contents of utterance written in orthography are pronounced with actual speech waveform signal data. Next, the second stage is a process of associating the respective phonemic symbols with speech segments of speech waveform signals in order to determine the start and end time points of each phoneme to measure prosodic and acoustic characteristics (hereinafter, the process is referred to as a phoneme alignment process). Further, the third stage is to generate feature vectors or feature parameters for respective phonemes. In these acoustic feature vectors, phoneme label, start time (or start position) of phonemes in each file within the speech waveform database stored in the speech waveform memory 30, speech fundamental frequency $F_0$, a phoneme duration, and a power value are stored as essential information. As optional information of the feature parameters, stress, accent type, position with respect to the prosodic boundary, spectral inclination, and the like are further stored. These feature parameters can be summarized, for example, as shown in Table 1.

TABLE 1

Index information:
    index number (assigned to one file)
    start time (or start position) of a phoneme in each file in the speech waveform database stored in the speech waveform database memory 30
    First acoustic feature parameters:
        12-degree melcepstrum coefficients
        12-degree delta melcepstrum coefficients
        phoneme label
        discriminative characteristics:
            vocalic (+) / non-vocalic (−)
            consonantal (+) / non-consonantal (−)
            interrupted (+) / continuant (−)
            checked (+) / unchecked (−)
            strident (+) / mellow (−)
            voiced (+) / unvoiced (−)
            compact (+) / diffuse (−)
            grave (+) / acute (−)
            flat (+) / plain (−)
            sharp (+) / plain (−)
            tense (+) / lax (−)
            nasal (+) / oral (−)
    First prosodic feature parameters:
        phoneme duration
        speech fundamental frequency $F_0$
        power value In the present preferred embodiment, the first acoustic feature parameters includes the above-mentioned parameters shown in Table 1, however, the present invention is not limited to this. The first acoustic feature parameters may include formant parameters and voice source parameters.

The start time (or start position), first acoustic feature parameters, and first prosodic feature parameters within the index information are stored in the feature parameter memory 30 for each phoneme. In this process, for example, twelve feature parameters of discriminative characteristics to be assigned to the phoneme label are given by parameter values of (+) or (−) for each item. An example of feature parameters, which are output results of the speech analyzer 10, is shown in Table 2.

Referring to Table 2, the index number is given one for each file of either one paragraph composed of a plurality of sentences or one sentence, in the speech waveform database memory 21, and the start time of a phoneme and its phoneme duration counted from the start time in the file in order to indicate the position of an arbitrary phoneme in the file to which one index number is assigned are imparted. Thus, a speech waveform of the phoneme concerned can be specifically determined.

TABLE 2

An example of feature parameters that are output results of the speech analyzer 10:
Index number X0005

| Phoneme | Duration | Fundamental frequency | Power | ... |
|---|---|---|---|---|
| # | 120 | 90 | 4.0 | ... |
| s | 175 | 98 | 4.7 | ... |
| ei | 95 | 102 | 6.5 | ... |
| dh | 30 | 114 | 4.9 | ... |
| ih | 75 | 143 | 6.9 | ... |
| s | 150 | 140 | 5.7 | ... |
| p | 87 | 137 | 5.1 | ... |
| l | 34 | 107 | 4.9 | ... |
| ii | 150 | 98 | 6.3 | ... |

TABLE 2-continued

An example of feature parameters that are output results of the speech analyzer 10:
Index number X0005

| Phoneme | Duration | Fundamental frequency | Power | ... |
|---|---|---|---|---|
| z | 140 | 87 | 5.8 | ... |
| # | 253 | 87 | 4.0 | ... |

In Table 2, the symbol "#" represents a pause.

Upon selecting a speech unit, it is necessary to calculate, before selecting a speech unit, how much the acoustic and prosodic feature parameters contribute in each phoneme. In the fourth stage, for this purpose, weighting coefficients for the respective feature parameters are calculated for all the speech samples in the speech waveform database.

In the process of generating a phonemic symbol sequence by the speech analyzer 10, for the present preferred embodiment, at least if recorded contents are described in orthography, every speech waveform database can be used as speech waveform data for synthesis, as described before. When only word information is given as the input, it is necessary to predict the sequence of phonemes based on dictionaries and rules. Also, in the process of aligning phonemes by the speech analyzer 10, when the speech is read aloud, the words would be pronounced, in many cases, nearly in their respective standard pronunciations, and rarely with hesitation or stammer. In the case of such speech waveform data, the phoneme labeling will be correctly achieved by simple dictionary search, enabling the training of phoneme models of phoneme HMM for use of phoneme alignment.

In the training of phoneme models for use of phoneme alignment, unlike the complete speech recognition, it is unnecessary to completely separate speech waveform data for training and speech waveform data for tests from each other, so that the training can be done for all the speech waveform data. First of all, with a model for another speaker used as an initial model, and with only standard pronunciation or limited pronunciational variations permitted for every word, the phoneme alignment is conducted by using Viterbi training algorithm with all speech waveform data so that appropriate segmentation is performed, and feature parameters are re-estimated. Whereas the pauses between words are processed according to intra-word pause generation rules, any failures of alignment due to pauses that are present in the words need to be corrected by person's hand.

There is a need of selection as to which phoneme label should be used as the representation of phonemes. If a phoneme set that allows the use of well trained HMM models is available, it is advantageous to use the phoneme set. Conversely, if the speech synthesizer apparatus has a complete dictionary, a method of completely checking the labels of the speech waveform database with the dictionary is also advantageous. Because we have room of selection for the training of weighting coefficients, it may appropriately be taken as the most important criterion whether or not any equivalent to the prediction by the speech synthesizer apparatus afterwards can be looked up from the speech waveform database. Since subtle differences in pronunciation are automatically grasped by the prosodic environment of the pronunciation, there is no need of executing the phoneme labeling by manual work.

As the stage succeeding the pre-processing, prosodic feature parameters for describing intonational characteristics of respective phonemes are extracted. In conventional phonetics, linguistic sounds have been classified according to such characteristics as utterance position and utterance mode. By contrast, in the phonetics that involves prosody, such as the Firth school or the like, clearly intoned places and emphasized places are distinguished from each other in order to capture fine differences in tone arising from differences in prosodic context. Although various methods are available for describing these differences, the following two methods are employed here. First of all, for lower order level, values obtained by averaging the power, the length of phoneme duration and the phoneme fundamental frequency $F_0$ of the one phoneme are used to determine one-dimensional features. For higher order level, a method of marking prosodic boundaries and emphasized places in view of the above-mentioned differences in the prosodic features is used. Whereas these two kinds of places have features closely correlated to each other such that one can be predicted from the other, both have strong effects on the characteristics of the respective phonemes.

As there is a degree of freedom for the method of prescribing phoneme sets with which the speech waveform database is described, so there is a degree of freedom for the method of describing prosodic feature parameters. However, the way of selection from these methods depends on the predictive ability of the speech synthesizer apparatus. If the speech waveform database has previously undergone the phoneme labeling, the task of the speech synthesizer apparatus is to appropriately train how to obtain actual speech in the speech waveform database from internal expressions. On the other hand, if the speech waveform database has not undergone the phoneme labeling, it is necessary to first investigate which feature parameters, when used, allow the speech synthesizer apparatus to predict the most appropriate speech unit. This investigation and the training of determining the weighting coefficients for feature parameters are executed by the weighting coefficient training controller 11 that calculates the weighting coefficients for respective feature parameters through training process.

Next, the weighting coefficient training process which is executed by the weighting coefficient training controller 11 is described. In order to select an optimal sample for acoustic and prosodic environments of any given target speech from the speech waveform database, it is necessary to first determine which features, and to what extent, contribute, depending on the differences in phonemic and prosodic environments. This is due to the fact that the kinds of important feature parameters change with properties of the phonemes. For example, the speech fundamental frequency $F_0$, although significantly effective for the selection of voiced speech, has almost no effect on the selection of unvoiced speech. Also, the acoustic features of fricative sound have different effects depending on the kinds of the preceding and succeeding phonemes. In order to select an optimal phoneme, what degrees of weights are placed on the respective features is automatically determined through the optimal weight determining process, i.e., the weighting coefficient training process.

In the optimal weighting coefficient determining process which is executed by the weighting coefficient training controller 11, the first step is to list features which are used for selecting an optimal sample from among all the applicable samples or speech segments of uttered speech in the speech waveform database. Employed in this case are phonemic features such as intonation position and intonation mode, as well as prosodic feature parameters such as the speech fundamental frequency $F_0$, phoneme duration, and power of the preceding phoneme, the target phoneme, and the succeeding phoneme. Actually, the second prosodic parameters which will be detailed later are used. Next, in the second step, in order to determine which feature parameters, and how much, are important in selecting optimal candidates for each phoneme, the acoustic distance including the difference in phoneme duration from all the other phoneme samples for one speech sample or segments (or including non-speech segments of speech signals of a phoneme), and the speech waveform segments of N2 best analogous speech samples or segments, i.e., N2 best phoneme candidates are selected.

Further, in the third stage, a linear regression analysis is performed, where the weighting coefficients representing the degrees of importance or contribution of respective feature parameters in various acoustic and prosodic environments are determined or calculated by using the pseudo speech samples. As the prosodic feature parameters in this linear regression analysis process, for example, the following feature parameters (hereinafter, referred to as second prosodic feature parameters) are employed:

(1) first prosodic feature parameters of a preceding phoneme that is just one precedent to a target phoneme to be processed (hereinafter, referred to as a preceding phoneme);

(2) first prosodic feature parameters of a phoneme label of a succeeding phoneme that is just one subsequent to a target phoneme to be processed (hereinafter, referred to as a succeeding phoneme);

(3) phoneme duration of the target phoneme;

(4) speech fundamental frequency $F_0$ of the target phoneme;

(5) speech fundamental frequency $F_0$ of the preceding phoneme; and (6) speech fundamental frequency $F_0$ of the succeeding phoneme.

In the present preferred embodiment, the linear regression analysis is performed for determining weighting coefficients, however, the present invention is not limited to this. The other type of statistical analysis may be performed for determining weighting coefficients. For example, a statistical analysis may be performed using a predetermined neural network for determining weighting coefficients.

In this case, the preceding phoneme is defined as the phoneme that is just one precedent to the target phoneme. However, the present invention is not limited to this, the preceding phoneme may include phonemes that are precedent by a plurality of phonemes. Also, the succeeding phoneme is defined as the phoneme that is just one subsequent to the target phoneme. However, the present invention is not limited to this, the succeeding phoneme may include phonemes that are subsequent by a plurality of phonemes. Furthermore, the speech fundamental frequency $F_0$ of the succeeding phoneme may be excluded.

Next, the processing by the speech unit selector 12 for executing the selection of natural speech samples or segments will be described hereinafter. The conventional speech synthesizer apparatus involves the steps of determining a phoneme sequence for a target utterance of speech, and further calculating target values of $F_0$ and phoneme duration for use of prosodic control. In contrast to this, the speech synthesizer of the present preferred embodiment involves only the step of calculating the prosody for the purpose of appropriately selecting an optimal speech sample, where the prosody is not controlled directly.

Figure 3:
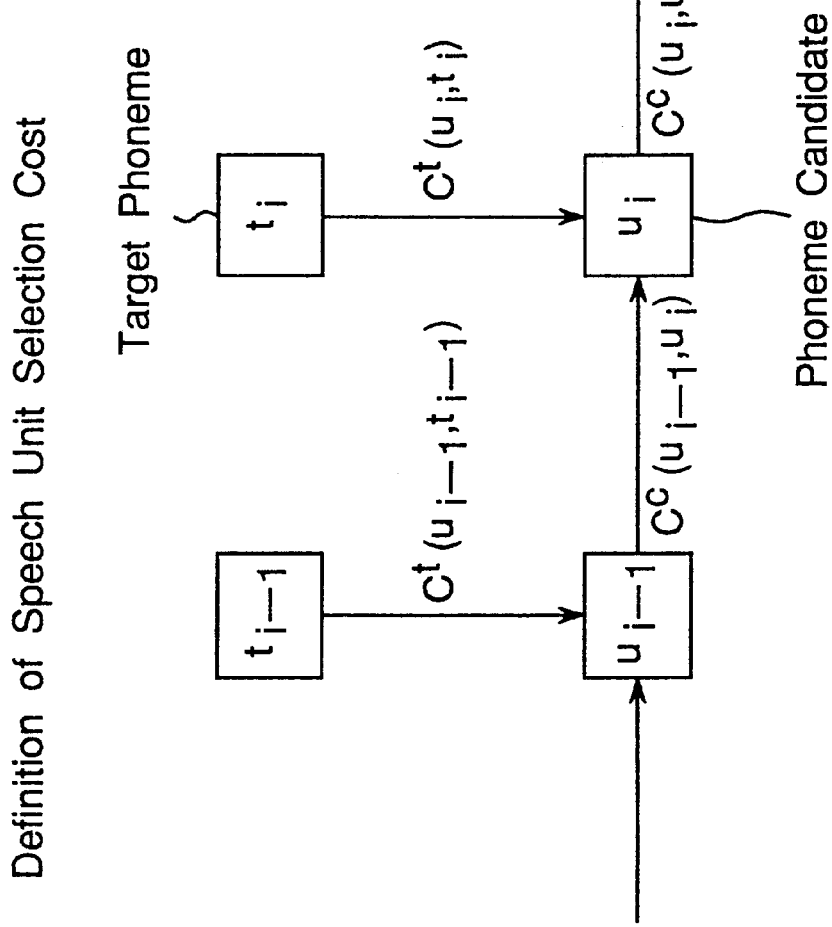
FIG. 3 is a model diagram showing a definition of speech unit selection cost calculated by a speech unit selector of FIG. 1.

Referring to FIG. 3, the input of the processing by the speech unit selector 12 of FIG. 1 is the phoneme sequence of a target utterance of speech, weight vectors for respective features determined on the respective phonemes and feature vectors representing all the samples within the speech waveform database. On the other hand, the output thereof is index information representing the positions of phoneme samples within the speech waveform database. Thus, FIG. 3 shows the start position and speech unit duration of respective speech units for concatenation of speech segments of speech waveform signals (where, more specifically, a phoneme, or in some cases, a sequence of a plurality of phonemes are selected in continuation as one speech unit).

An optimal speech unit can be determined as a path that minimizes the sum of the target cost, which represents an approximate cost of the difference from the target utterance of speech, and the concatenation cost, which represents an approximate cost of discontinuity between adjacent speech units. A known Viterbi training algorithm is used for the path search. With respect to a target speech $t_1^n = (t_1, \ldots, t_n)$, minimizing the sum of target cost and concatenation cost makes it possible to select such a combination of speech units, $u_1^n = (u_1, \ldots, u_n)$, in the speech waveform database that the features are closer to those of the target speech and the discontinuity between the speech units is smaller. Thus, by indicating the positions of these speech units in the speech waveform database, the speech synthesis of the contents of any arbitrary utterance can be performed.

Referring to FIG. 3, the speech unit selection cost comprises the target cost $C^t(u_i, t_i)$ and the concatenation cost $C^c(u_{i-1}, u_i)$. The target cost $C^t(u_i, t_i)$ is a predictive value of the difference between a speech unit (or phoneme candidate) $u_i$ in the speech waveform database and a speech unit (or target phoneme) $t_i$, to be realized as synthesized speech, while the concatenation cost $C^c(u_{i-1}, u_i)$ is a predictive value of the discontinuity that results from the concatenation between concatenation units (two phonemes to be concatenated) $u_{i-1}$ and $u_i$. In terms of minimizing the target cost and the concatenation cost, a similar concept was adopted in, for example, the conventional ATR v-Talk speech synthesizing system of ATR Interpreting Telecommunications Research Laboratories, which was studied and developed into practical use by the present applicant. However, the fact that the prosodic feature parameters are used directly for unit selection forms a novel feature of the speech synthesizer apparatus of the present preferred embodiment.

Next, cost calculation will be described. The target cost is a weighted sum of differences between the respective elements of the feature vector of the speech unit to be realized and the respective elements of the feature vector of a speech unit that is a candidate selected from the speech waveform database. Given weighting coefficients $w^t_j$ for respective target sub-costs $C^t_j(t_i, u_i)$, the target cost $C^t(t_i, u_i)$ can be calculated by the following equation (1):

$$C^t(t_i, u_i) = \sum_{j=1}^{P} W^t_j C^t_j(t_i, u_i) \quad (1)$$

where the differences between the respective elements of the feature vectors are represented by p target sub-costs $C^t_j(t_i, u_i)$ (where j is a natural number from 1 to p), and the number of dimensions p of the feature vectors is variable within a range of 20 to 30 in the present preferred embodiment. In a more preferred embodiment, the number of dimensions p=30, and the feature vectors or feature parameters with the variable j in the target sub-costs $C^t(t_i, u_i)$ and weighting coefficients $w^t_j$ are the above-mentioned second prosodic feature parameters.

On the other hand, the concatenation cost $C^c(u_{i-1}, u_i)$ can be represented likewise by a weighted sum of q concatenation sub-costs $C^c_j(u_{i-1}, u_i)$ (where j is a natural number from 1 to q). The concatenation sub-cost can be determined or calculated from acoustic characteristics of speech units $u_{i-1}$ and $u_i$ to be concatenated. In the preferred embodiment, the following three kinds:

(1) cepstral distance at a concatenation point of phonemes, (2) absolute value of a difference in a logarithmic power, and (3) absolute value of a difference in a speech fundamental frequency $F_0$, are used as the concatenation sub-costs, where q=3. These three kinds of acoustic feature parameters, the phoneme label of the preceding phoneme and the phoneme label of the succeeding phoneme are referred to as third acoustic feature parameters. The weights $w^c_j$ of respective concatenation sub-costs $C^c_j(u_{i-1}, u_i)$ are given heuristically (or experimentally) beforehand, in this case, the concatenation cost $C^c(u_{i-1}, u_i)$ can be calculated by the following equation (2):

$$C^c(u_{i-1}, u_i) = \sum_{j=1}^{q} W^c_j C^c_j(u_{i-1}, u_i) \quad (2)$$

If the phoneme candidates $u_{i-1}$ and $u_i$ are adjacent speech units in the speech waveform database, then the concatenation is a natural one, resulting in a concatenation cost of 0. In the preferred embodiment, the concatenation cost is determined or calculated based on the first acoustic feature parameters and the first prosodic feature parameters in the feature parameter memory 30, where the concatenation cost, which involves the above-mentioned three third acoustic feature parameters of continuous quantity, assumes any analog quantity in the range of, for example, 0 to 1. On the other hand, the target cost, which involves the above-mentioned 30 second acoustic feature parameters showing whether or not the discriminative characteristics of respective preceding or succeeding phonemes are coincident, includes elements represented by digital quantities of, for example, zero when the features are coincident for each parameter or one when the features are not coincident for each parameter. Then, the concatenation cost for N speech units results in the sum of the target cost and the concatenation cost for the respective speech units, and can be represented by the following equation (3):

$$C(t_1^n, u_1^n) = \sum_{i=1}^{n} C^t(t_i, u_i) + \sum_{i=2}^{n} C^c(u_{i-1}, u_i) + \quad (3)$$
$$C^c(S, u_1) + C^c(u_n, S)$$

where S represents a pause, and $C^c(S, u_1)$ and $C^c(u_n, S)$ represent the concatenation costs for a concatenation from a pause to the first speech unit and for another concatenation from the last speech unit to a pause, respectively. As is apparent from this expression, the present preferred embodiment treats the pause in absolutely the same way as that of the other phonemes in the speech waveform database. The above-mentioned equation (3) can be expressed directly with sub-costs by the following equation (4):

$$C(t_1^n, u_1^n) = \sum_{i=1}^{n}\sum_{j=1}^{p} W_j^t C^t(t_i, u_i) + \sum_{i=2}^{n}\sum_{j=1}^{q} C^c(u_{i-1}, u_i) + \quad (4)$$

$$C^c(S, u_1) + C^c(u_n, S)$$

The speech-unit selection process is purposed to determine the combination of speech units, $\overline{u_1^n}$, that minimizes the total cost that depends on the above-mentioned equation (4) as follows.

$$\overline{u_1^n} = \min C(t_1^n, u_1^n) \qquad u_1, u_2, \ldots, u_n \quad (5)$$

In the above-mentioned preferred embodiment, as apparent from the equation (4), the linear combination is used as the cost function. The present invention is not limited to this, the following non-linear multiplication or non-linear combination may be used.

Evaluating the target distance for a candidate unit, or the distance between a pair of units to be concatenated, returns only a physical measure of the distance separating the two speech waveform signals, and is not necessarily a true indicator of the distortion that may be perceived when using the particular candidate units for speech synthesis.

The goal of the current approach is to try to find a function relating the physical distances measured from the signal to the suitability of the unit for synthesis in a given context, in a manner analogous to the perceptual stimuli relationship. This modeling concentrates all assumptions about the capabilities of the subsequent signal processing routines, and about human audio-perception etc., at this central point.

The mathematical framework for the computation and combination of those suitabilities is motivated by fuzzy logic. Assuming that the perfect sequence of units is not contained in a finite database, calculated mismatches between existing units have to be gradually quantized, balanced and a compromise found.

Using a procedure analogous to fuzzy membership functions, the suitability functions for each single distance are defined in the range of zero to one, where "1" denotes a perfected match, and "0" denotes an unacceptable mismatch, as illustrated in FIGS. 8 to 11. A typical suitability function, e.g., for pitch target mismatch, could be a Gaussian over the pitch axis centered at the target pitch. Small (perceptually irrelevant) distances close to the target value result in suitabilities close to one. Big unacceptable mismatches result in zero suitability. Other units which are not perfectly matching but are within an acceptable distance are gradually weighted by the monotone decline between the extreme values. Anysimilar monotonically declining function may match these assumption as well.

Suitability functions S are extensively employed in the target and joint functions $C^t$ and $C^c$ which follow. A suitability function is defined by the following formula:

$$S = \exp\{-(|t_i - u_i| / T)R + b\} + \min \quad (6),$$

where $b = \log(\max - \min)$, and $\quad (7)$ $0 = \min < \max = 1 \quad (8).$ $t_i$ is a target value of some variable, and $t_i$ is replaced by $u_{i-1}$ in the joint cost;
$u_i$ is an actual value;
T is a tolerance; and
R is a rate;
min is the minimum value; and
max is the maximum value.

The concatenation cost for N speech units corresponding to the formula (3) is represented by the following formula:

$$C(t_1^n, u_1^n) = \prod_i S_1 + \prod_i S_2 \quad (9)$$

where $S_1$ is the suitability function for the target cost and $S_2$ is the suitability function for the joint cost.

Otherwise, the following concatenation cost for N speech units corresponding to the formula (3) may be used in stead of the formula (9):

$$C(t_1^n, u_1^n) = \sum_i S_1 + \sum_i S_2 \quad (10)$$

The following Figures show suitability functions for various values of T, R, min and max. FIGS. 8 to 11 are graphs each showing an example of a non-linear suitability function S to a target value $t_i$ which is used in the cost function of a modified preferred embodiment according to the present invention.

Figure 8:
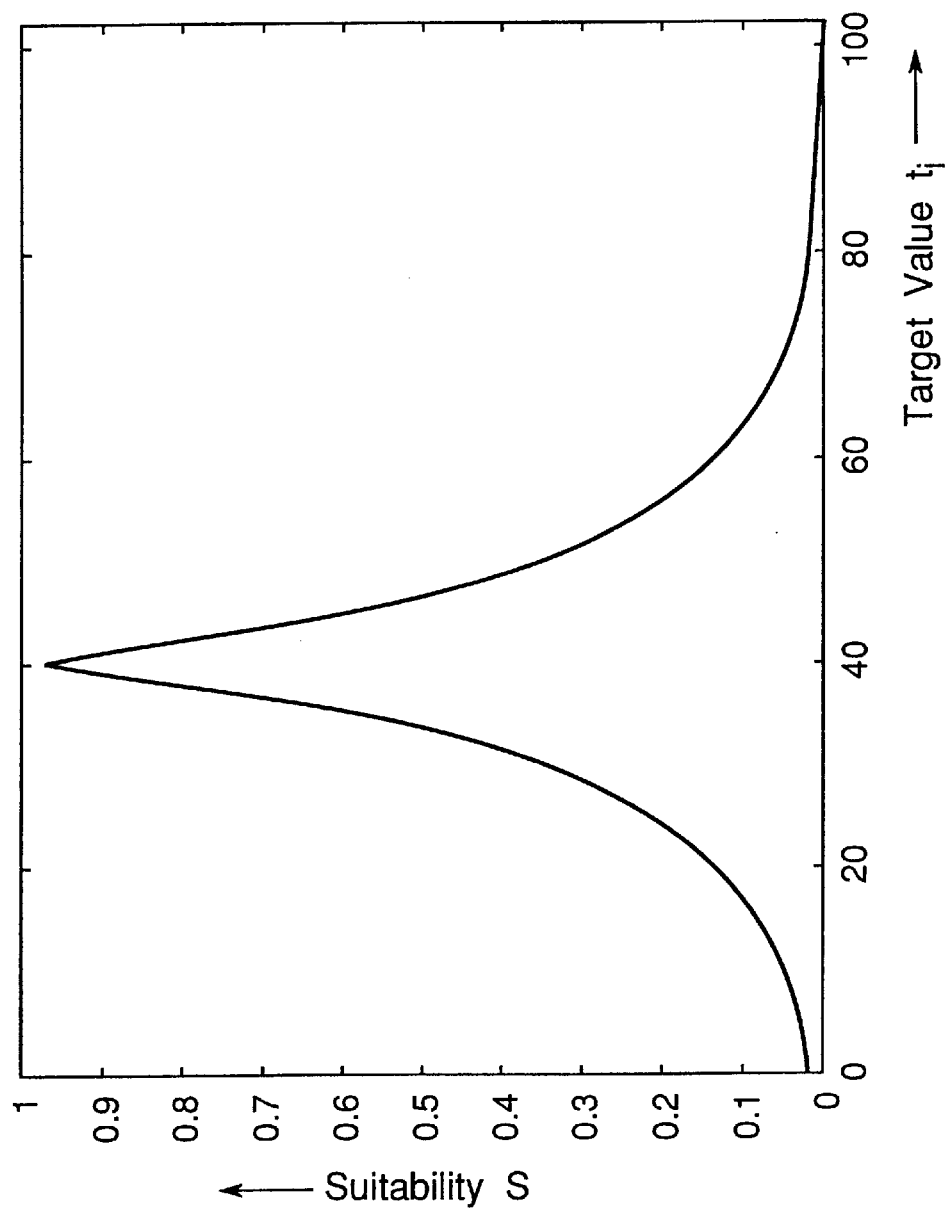
FIG. 8 is a graph showing a first example of a non-linear suitability function S to a target value $t_i$ which is used in the cost function of a modified preferred embodiment according to the present invention.

In the suitability function S shown in FIG. 8, the parameters are set such that the target value is 40, the rate is 1, the tolerance is 10, min is 0 and max is 1.

Figure 9:
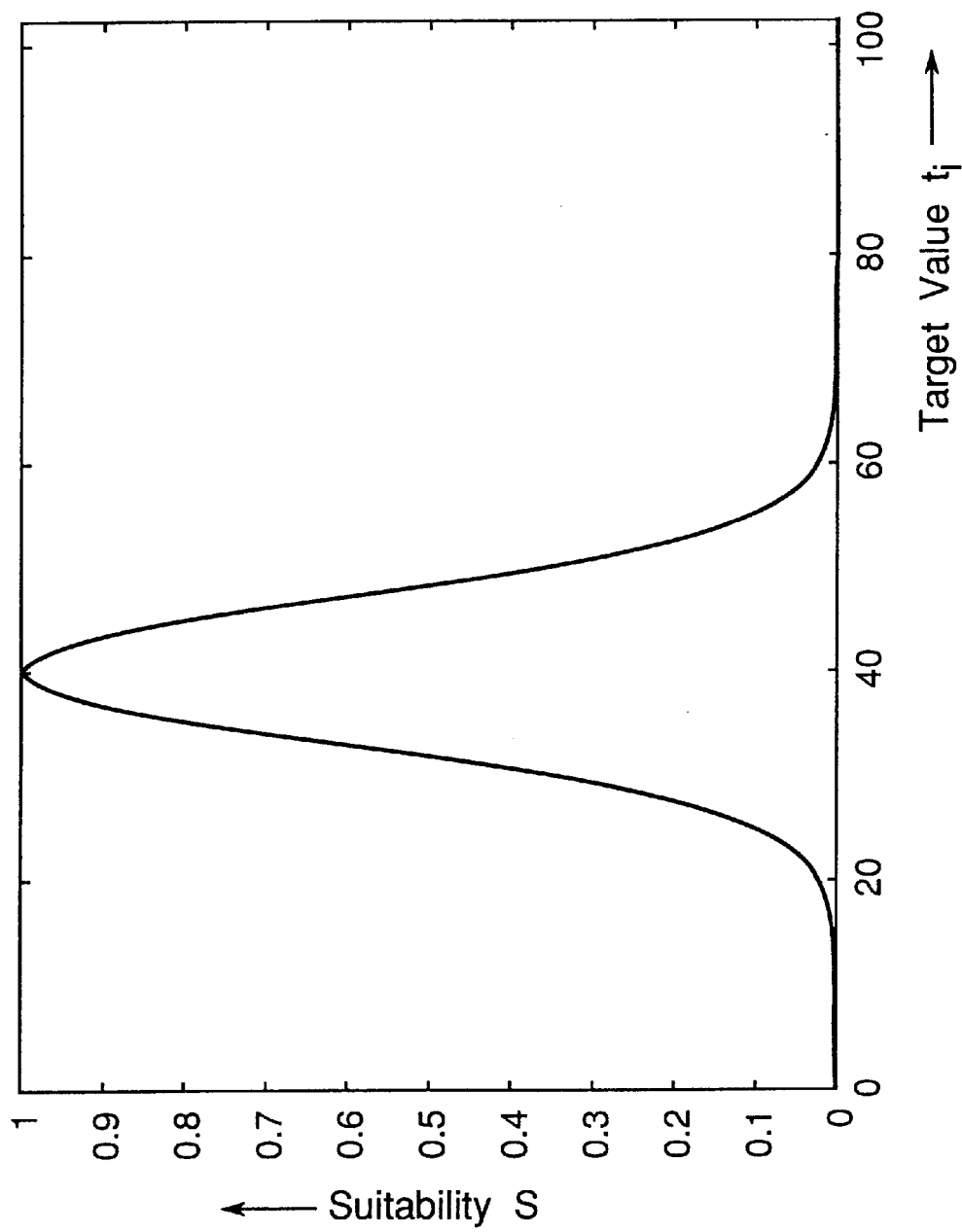
FIG. 9 is a graph showing a second example of a non-linear suitability function S to a target value $t_i$ which is used in the cost function of a modified preferred embodiment according to the present invention.

In the suitability function S shown in FIG. 9, the parameters are set such that the target value is 40, the rate is 2, the tolerance is 10, min is 0 and max is 1.

Figure 10:
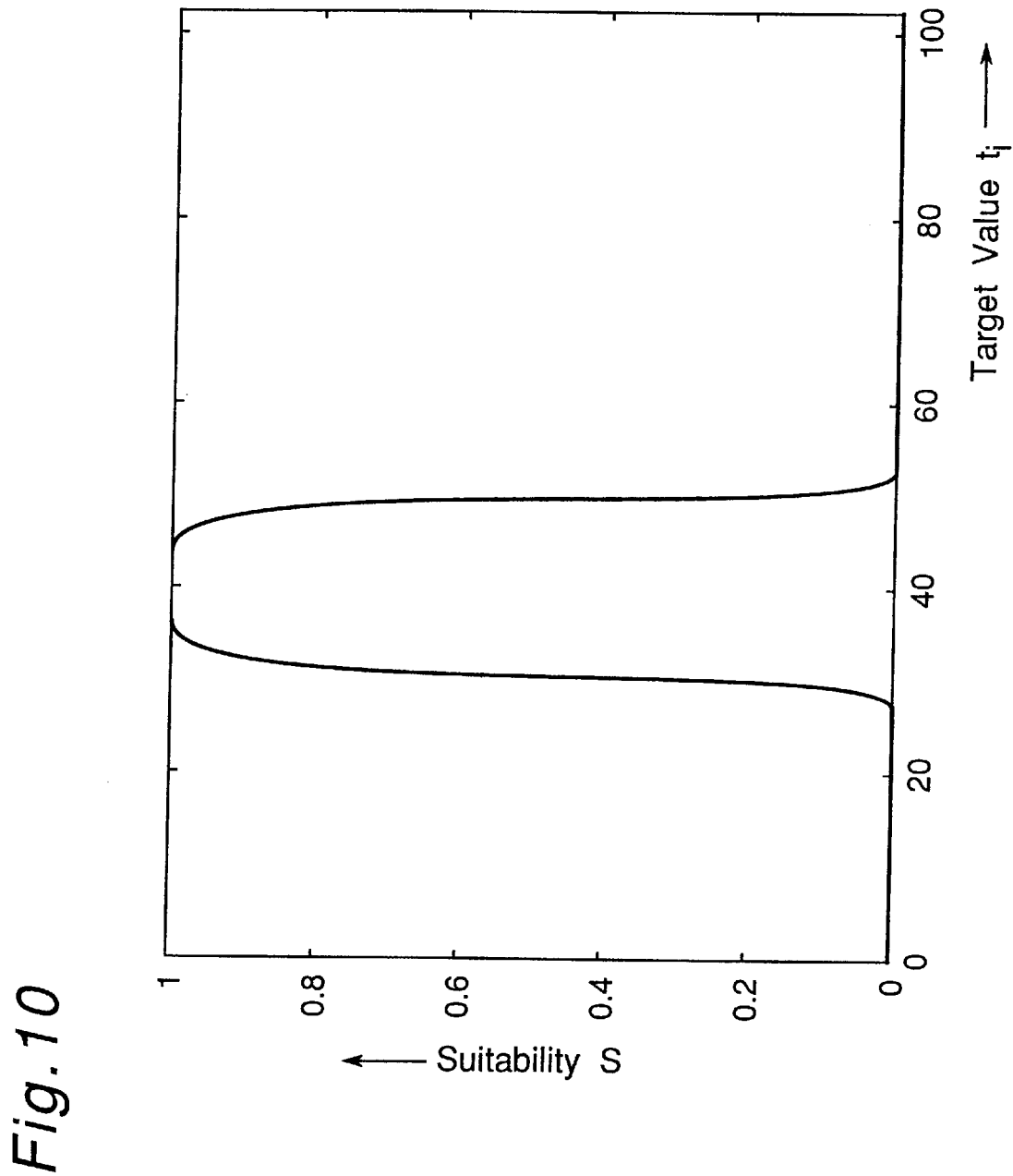
FIG. 10 is a graph showing a third example of a non-linear suitability function S to a target value $t_i$ which is used in the cost function of a modified preferred embodiment according to the present invention.

In the suitability function S shown in FIG. 10, the parameters are set such that the target value is 40, the rate is 10, the tolerance is 10, min is 0 and max is 1.

Figure 11:
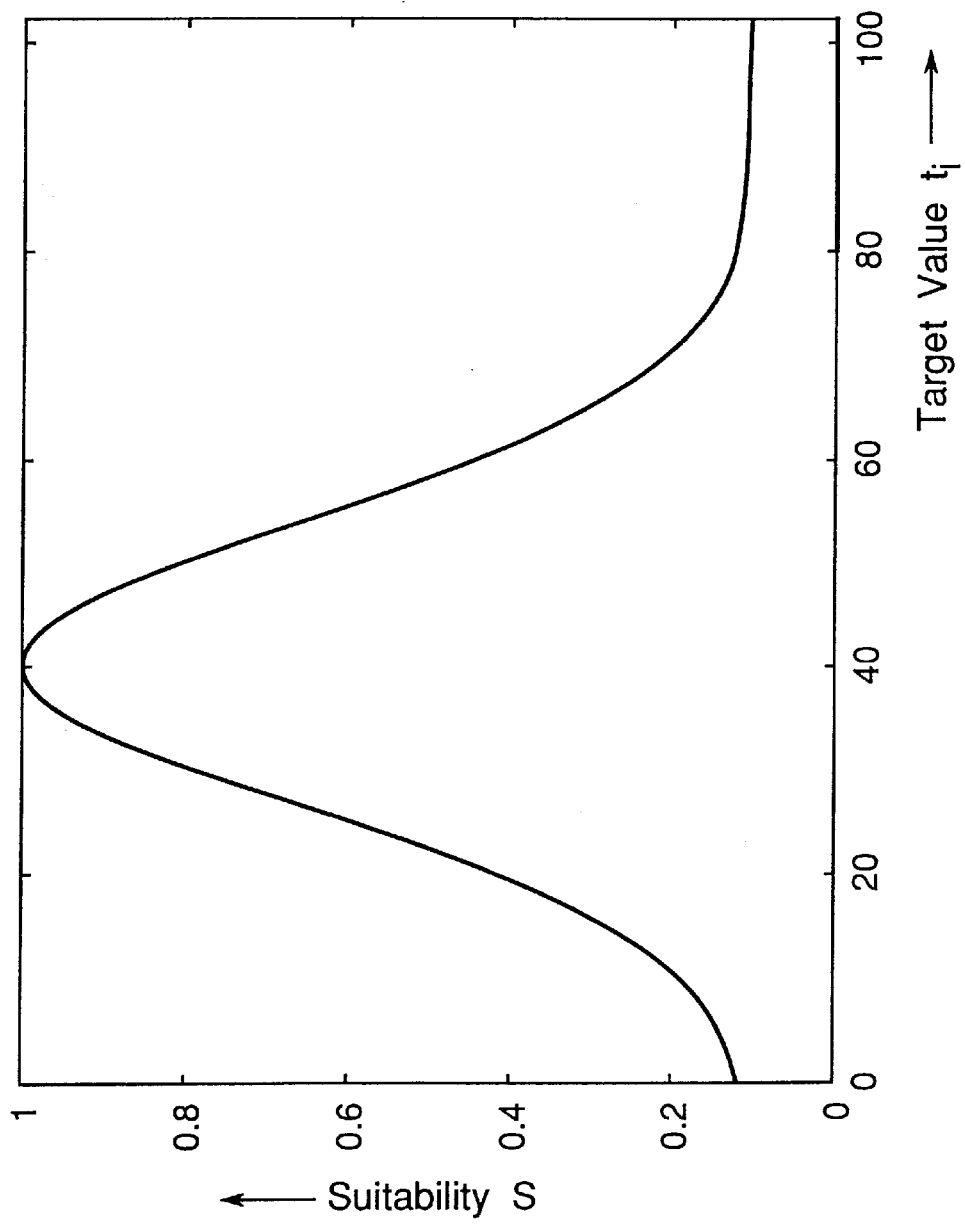
FIG. 11 is a graph showing a fourth example of a non-linear suitability function S to a target value $t_i$ which is used in the cost function of a modified preferred embodiment according to the present invention

In the suitability function S shown in FIG. 11, the parameters are set such that the target value is 40, the rate is 2, the tolerance is 20, min is 0.1 and max is 1.

The cost functions of the non-linear multiplication and the non-linear combination result in improvement in the precision of the unit selection.

In the above-mentioned Equation (5), the function min is a function that represents a combination of phoneme candidates (i.e., phoneme sequence candidates), $u_1, u_2, \ldots, u_n = \overline{u_1^n}$, that minimizes the argument of the function, $C(t_1^n, u_1^n)$.

Now the weighting coefficient training process which is performed by the weighting coefficient training controller 11 of FIG. 1 will be described below. Weights for the target sub-costs are determined or calculated by using the linear regression analysis based on the acoustic distances. In the weighting coefficient training process, different weighting coefficients may be determined or calculated for all the phonemes, or weighting coefficients may be determined or calculated for respective phoneme categories (e.g., all nasal sounds). Otherwise, a common weighting coefficient for all the phonemes may be determined or calculated. In this case, however, different weighting coefficients for respective phonemes are employed.

Each token or speech sample stored in the database of the feature parameter memory 30 is described by a set of the first phonemic and prosodic feature parameters related to its acoustic characteristics. The weight coefficients are trained in order to determine the strength of relationship between each individual first phonemic and prosodic feature parameters and differences in the acoustic characteristics of the token (phone in context).

The flow of the process of the linear regression analysis is shown below:

Step I: Upon all the samples or speech segments in the speech waveform database that belong to the phonemic kind (or phonemic category) under the current training, the following four processes (a) to (d) are executed repeatedly:

(a) Assume speech samples or segments as the target utterance content picked up from the speech waveform database;

(b) Calculate acoustic distances between the speech sample and all the other samples belonging to the same phonemic kind or category in the speech waveform database;

(c) Select top N1 best phoneme candidates (for example, N1=20) closest to the target phoneme; and (d) Determine or calculate the target sub-costs $C^r_j(t_i, u_i)$ for the target phoneme itself $t_i$ and the top N1 samples selected in the above (c).

Step II: The acoustic distances and the target sub-costs $C^r_j(t_i, u_i)$ are calculated for all the target phonemes $t_i$ and the top N1 optimal samples.

Step III: The linear regression is used to predict the contribution of each factors of the first phonemic and prosodic feature parameters representing the target phoneme by a linear weighting of the t target sub-costs. The weight coefficients determined by the linear regression are used as the weight coefficients for the target sub-costs $w^r_j$ for current phoneme set or kind (category).

The above-mentioned costs are calculated by using these weighting coefficients. Then, the processes of Step I to Step III are repeated for all the phonemic kinds or categories.

The purpose of this weighting coefficient training controller 11 is to determine what weighting coefficient should be applied to multiply the respective target sub-costs in order to select out a speech sample that is the closest when the acoustic distances of the target speech unit, if possible, could be directly determined. An advantage of the present preferred embodiment is that the speech segments of the speech waveform signals in the speech waveform database can be directly utilized.

In the speech synthesizer apparatus of the preferred embodiment shown in FIG. 1 which is constructed as described above, the speech analyzer 10, the weighting coefficient training controller 11, the speech unit selector 12 and the speech synthesizer 13 are implemented by, for example, a digital computer or arithmetic and control unit or controller such as a microprocessing unit (MPU) or the like, while the text database memory 22, a phoneme HMM memory 23, the feature parameter memory 30 and the weighting-coefficient vector memory 31 are implemented by, for example, a storage unit such as a hard disk or the like. In the present preferred embodiment, the speech waveform database memory 21 is a storage unit of CD-ROM type.

The processing which is performed by the respective processing units 10 to 13 of the speech synthesizer apparatus of FIG. 1 constructed as described above will be described below.

Figure 4:
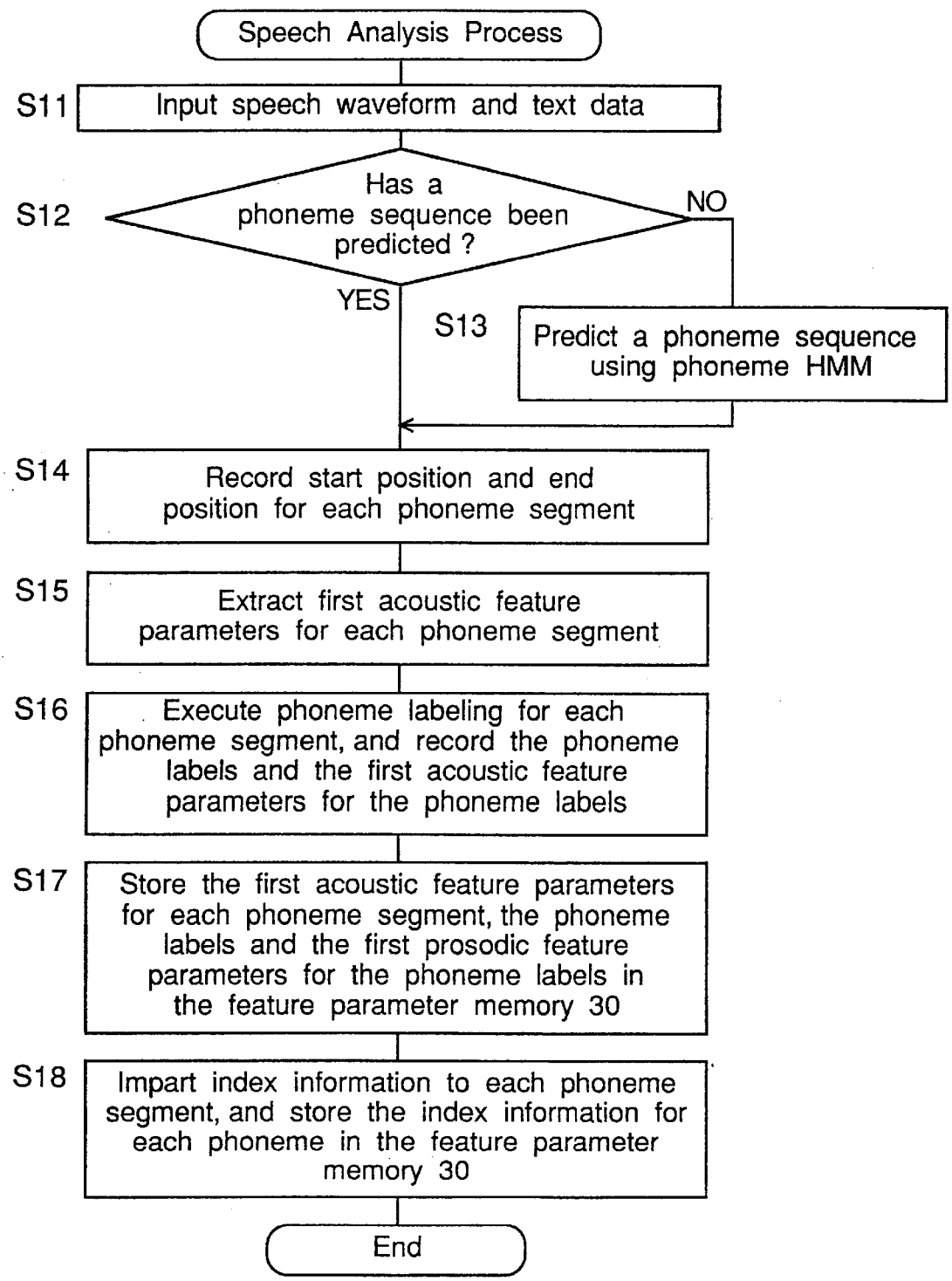
FIG. 4 is a flowchart of a speech analysis process which is executed by a speech analyzer of FIG. 1.

FIG. 4 is a flowchart of the speech analysis process which is executed by the speech analyzer 10 of FIG. 1.

Referring to FIG. 4, first of all, at step S11, speech segments of speech waveform signals of natural utterance are inputted from the speech waveform database memory 21 to the speech analyzer 10, and the speech segments of the speech waveform signals are converted into digital speech waveform signal data through analog to digital conversion, while text data or character data obtained by writing down the speech sentence of the above speech waveform signal is inputted from the text database stored in the text database memory 22 to the speech analyzer 10. It is noted that any text data may be absent, where if any text data is absent, text data may be obtained from speech waveform signal data through speech recognition using a known speech recognizing apparatus. In addition, the digital speech waveform signal data resulting from the analog to digital conversion has been divided into speech segments in a unit of, for example, 10 milliseconds. Then, at step S12, it is decided whether or not the phoneme sequence has been predicted. At step S12, if the phoneme sequence has not been predicted, the phoneme sequence is predicted and stored, for example, by using the phoneme HMM, the program flow proceeds to step S14. If the phoneme sequence has been predicted or previously given or the phoneme label has been given by manual work at step S12, the program flow goes to step S14, directly.

At step S14, the start position and end position in the speech waveform database file composed of either a plurality of sentences or one sentence for each phoneme segment are recorded, and an index number is assigned to the file. Next, at step S15, the first acoustic feature parameters for each phoneme segment are extracted by using, for example, a known pitch extraction method. Then, at step S16, the phoneme labeling is executed for each phoneme segment, and the phoneme labels and the first acoustic feature parameters for the phoneme labels are recorded. Further, at step S17, the first acoustic feature parameters for each phoneme segment, the phoneme labels and the first prosodic feature parameters for the phoneme labels are stored in the feature parameter memory 30 together with the file index number and the start position and time duration in the file. Finally, at step S18, index information including the index number of the file and the start position and time duration in the file are given to each phoneme segment, and the index information is stored in the feature parameter memory 30, then the speech analysis process is completed.

Figure 5:
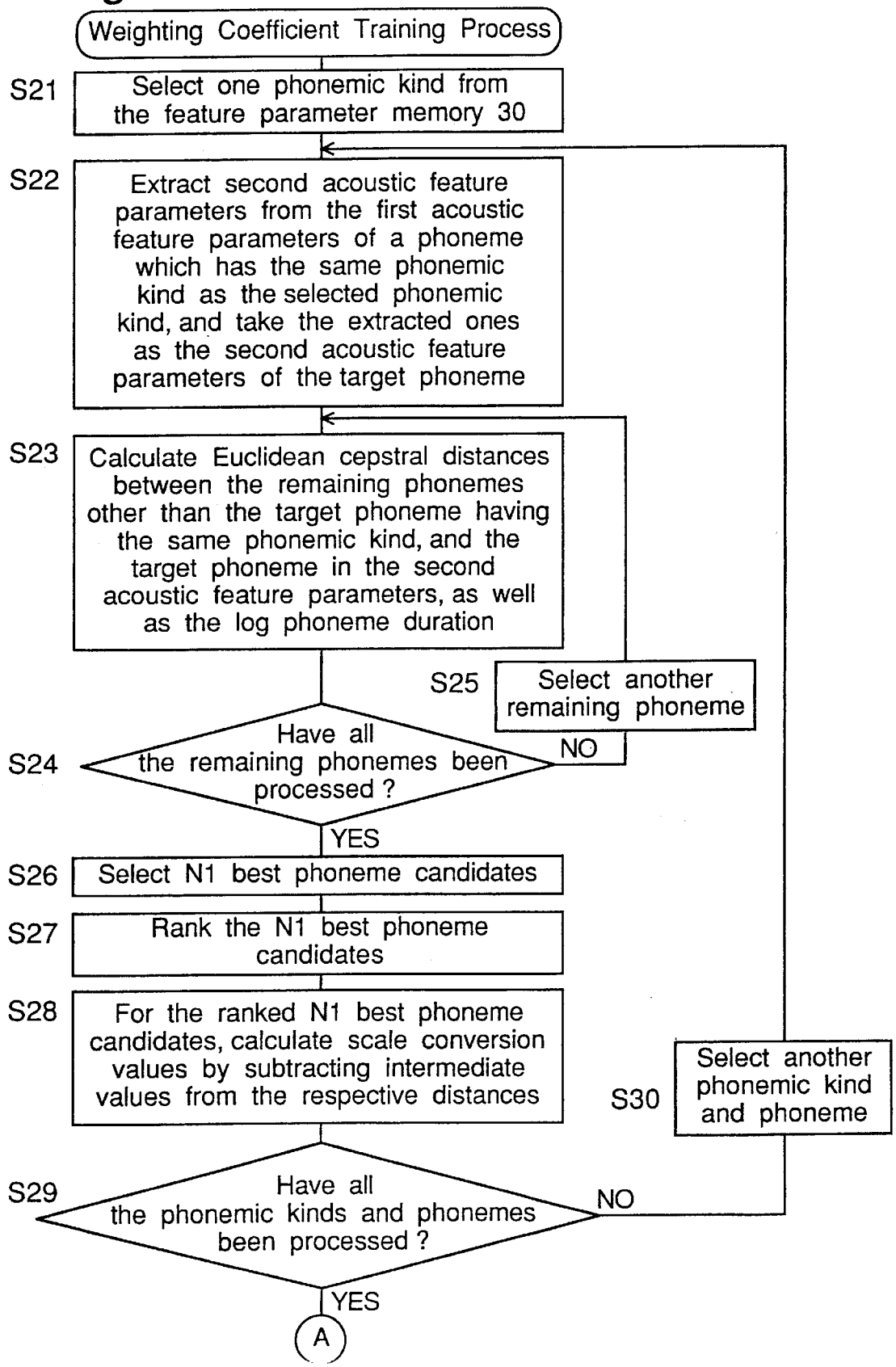
FIG. 5 is a flowchart of a first part of a weighting coefficient training process which is processed by a weighting coefficient training controller of FIG. 1.
Figure 6:
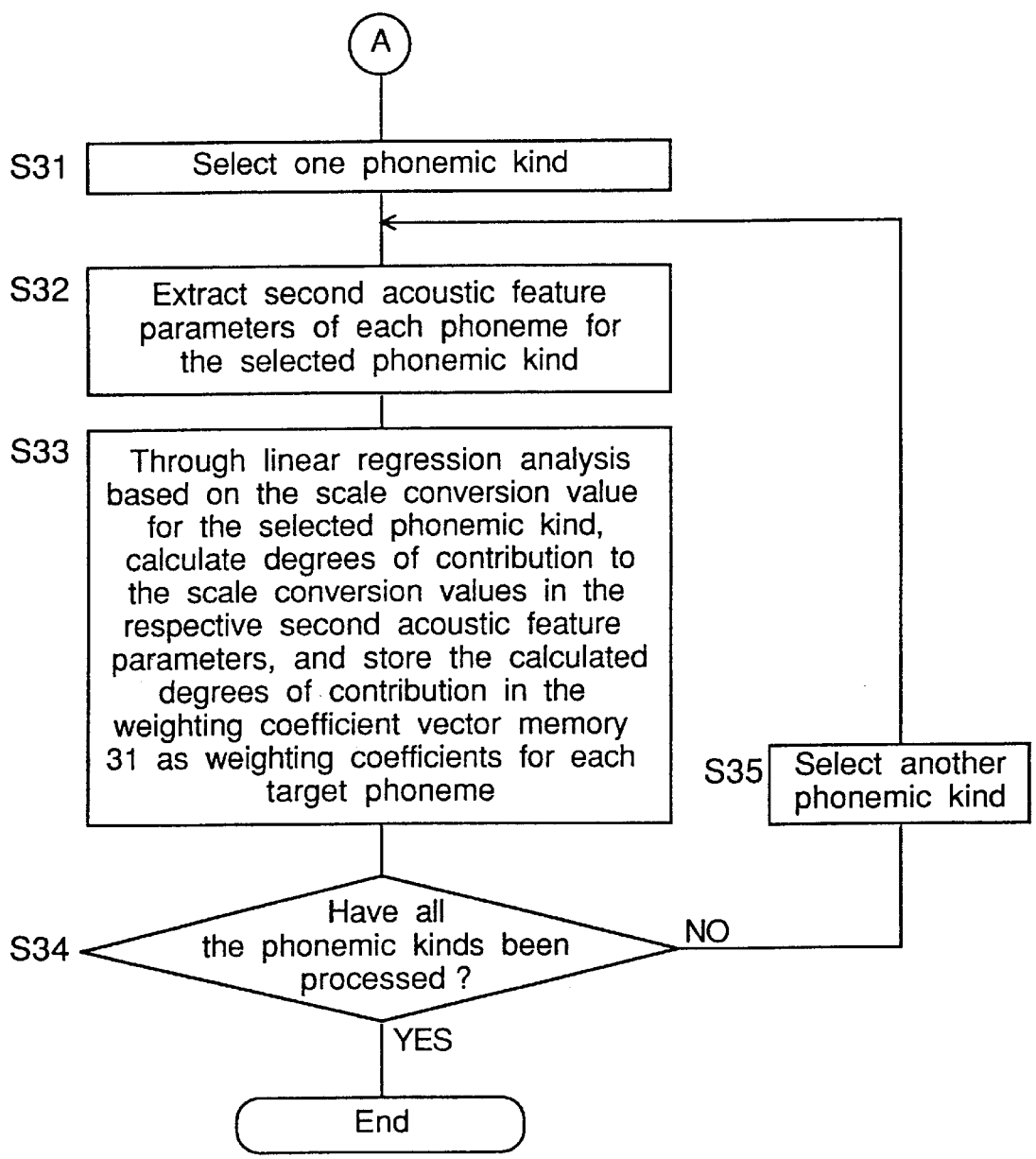
FIG. 6 is a flowchart of a second part of the weighting coefficient training process which is executed by the weighting coefficient training controller of FIG. 1.

FIGS. 5 and 6 are flowcharts of the weighting coefficient training process which is executed by the weighting coefficient training controller of FIG. 1.

Referring to FIG. 5, first of all, at step S21, one phonemic kind is selected from the feature parameter memory 30. Next, at step S22, the second acoustic feature parameters are extracted from the first acoustic feature parameters of a phoneme that has the same phonemic kind as the selected phonemic kind, and then, are taken as the second acoustic feature parameters of the target phoneme. Then, at step S23, the Euclidean cepstral distances of acoustic distances between the remaining phonemes other than the target phoneme that have the same phonemic kind, and the target phoneme in the second acoustic feature parameters, as well as the log phoneme duration with the bottom of 2 are calculated. At step S24, it is decided whether or not the processes of steps S22 and S23 have been done on all the remaining phonemes. At step S24, if the processes have not been completed for all the remaining phonemes, another remaining phoneme is selected at step S25, and then, the processes of step S23 and the following thereto are iterated.

On the other hand, if the processing has been completed at step S24, the top N1 best phoneme candidates are selected at step S26 based on the distances and time durations obtained at step S23. Subsequently, at step S27, the selected N1 best phoneme candidates are ranked into the first to N1-th places. Then, at step S28, for the ranked N1 best phoneme candidates, the scale conversion values are calculated by subtracting intermediate values from the respective distances. Further, at step S29, it is decided whether or not the processes of steps S22 to S28 has been completed for all the phonemic kinds and phonemes. If the processes of steps S22 to S28 have not been completed for all the phonemic kinds, another phonemic kind and phoneme is selected at step S30, and then the processes of step S22, and the following are iterated. On the other hand, if the processes of steps S22 to S28 has been completed for all the phonemic kinds at step S29, the program flow goes to step S31 of FIG. 6.

Referring to FIG. 6, at step S31, one phonemic kind is selected. Subsequently, at step S32, the second acoustic feature parameters for each phoneme are extracted for the selected phonemic kind. Then, at step S33, by performing the linear regression analysis based on the scale conversion value for the selected phonemic kind, the degrees of contribution to the scale conversion values in the second acoustic feature parameters are calculated, and the calculated degrees of contribution are stored in the weighting coefficient vector memory 31 as weighting coefficients for each target phoneme. At step S34, it is decided whether or not the processes of steps S32 and S33 has been completed for all the phonemic kinds. If the processes have not been completed for all the phonemic kinds at step S34, another phonemic kind is selected at step S35, and the processes of step S32 and the following are iterated. On the other hand, if the processes has been completed for all the phonemic kinds at step S34, the weighting coefficient training process is completed.

It is noted that degrees of contribution in the second prosodic feature parameters are previously given heuristically or experimentally, and the degrees of contribution are stored in the weighting coefficient vector memory 31 as weighting coefficient vectors for each target phoneme.

Figure 7:
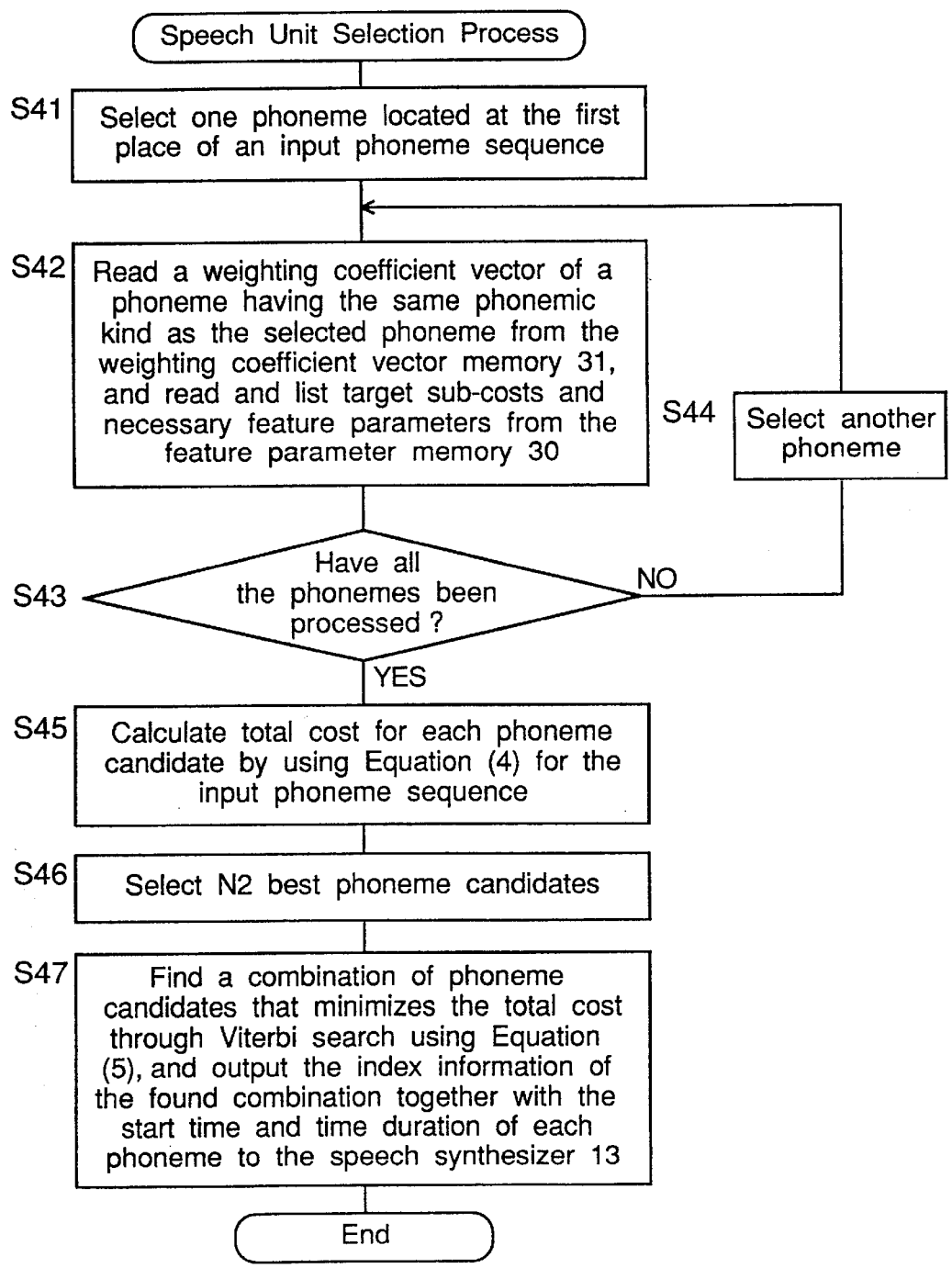
FIG. 7 is a flowchart of a speech unit selection process which is executed by the speech unit selector of FIG. 1.

FIG. 7 is a flowchart of the speech unit selection process which is executed by the speech unit selector of FIG. 1.

Referring to FIG. 7, first of all, at step S41, the first phoneme located at the first position of an input phoneme sequence is selected. Subsequently, at step S42, a weighting coefficient vector of a phoneme having the same phonemic kind as the selected phoneme is read out from the weighting coefficient vector memory 31, and target sub-costs and necessary feature parameters are read out and listed from the feature parameter memory 30. Then, at step S43, it is decided whether or not the processing has been completed for all the phonemes. If the processes have not been completed for all the phonemes at step S43, the next phoneme is selected at step S44, and then, the process of step S42 is iterated. On the other hand, if the processes have not been completed at step S43 for all the phonemes, the program flow goes to step S45.

At step S45, the total cost for each phoneme candidate is calculated using the Equation (4) for the input phoneme sequence. Subsequently, at step S46, the top N2 best phoneme candidates are selected for the respective target phonemes based on the calculated cost. Thereafter, at step S47, index information on the combination of phoneme candidates that minimizes the total cost together with the start time and the time duration of each phoneme are searched and outputted to the speech synthesizer 13 utilizing the Viterbi search using the Equation (5), and then the speech unit selection process is completed.

Further, based on the index information and the start time and time duration of each phoneme which are outputted from the speech unit selector 12, the speech synthesizer 13 reads out digital speech waveform signal data of the unit selected phoneme candidates by accessing the speech waveform database memory 21, and the read-out digital speech waveform signal data is D/A converted to an analog speech signal, then the converted analog speech signal is outputted through the loudspeaker 14. Thus, synthesized speech corresponding to the input phoneme sequence is outputted from the loudspeaker 14.

As described above, in the speech synthesizer apparatus of the present preferred embodiment, the method of minimizing the process by using a large scale database of natural speech has been described with a view to maximizing the naturalness of output speech. The speech synthesizer of the present preferred embodiment comprises the four processing units 10 to 13.

(A) SPEECH ANALYZER 10

The speech analyzer 10 of a processing unit receives, as inputs, any arbitrary speech waveform signal data accompanied by text written in orthography, and then calculates and outputs feature vectors for describing the characteristics of all the phonemes in the speech waveform database.

(B) WEIGHTING Coefficient TRAINING CONTROLLER 11

The weighting coefficient training controller 11 of a processing unit determines or calculates optimal weighting coefficients of respective feature parameters, as weight vectors, for selecting a speech unit that best fits the synthesis of target speech by using the feature vectors of speech segments of the speech waveform database and the original waveforms of the speech waveform database.

(C) SPEECH UNIT SELECTOR 12

The speech unit selector 12 of a processing unit generates index information for the speech waveform database memory 21 from the feature vectors and weight vectors of all the phonemes in the speech waveform database as well as the description of utterance contents of objective speech.

(D) SPEECH SYNTHESIZER 13

The speech synthesizer 13 of a processing unit synthesizes speech by accessing and reading out the speech segments of the speech signals in the speech waveform database stored in the speech waveform database memory 21 with skipping them and concatenation of them, according to the generated index information, and by D/A converting and outputting the objective speech signal data comprised of the read-out speech segments to the loudspeaker 14.

In the present preferred embodiment, the compression of speech waveform signal data and the correction of speech fundamental frequency $F_0$ and phoneme duration have been eliminated, but alternatively, there arises a need of carefully labeling speech samples and selecting optimums from the large scale speech waveform database. The fundamental unit for the speech synthesis method of the present preferred embodiment is the phoneme, which is generated by dictionaries or text phoneme conversion programs, where it is demanded that sufficient variations of phonemes even with the same phoneme be contained in the speech waveform database. In the speech unit selection process from a speech waveform database, is selected a combination of phoneme samples that fits the objective prosodic environment and yet that has the lowest discontinuity between adjacent speech units at the time of concatenation. For this purpose, the optimal weighting coefficients for respective feature parameters are determined or calculated for each phoneme.

The features of the speech synthesizer apparatus of the present preferred embodiment are as follows.

(A) USE OF PROSODIC INFORMATION AS UNIT SELECTION CRITERIA

From the standpoint that the spectral features are inseparably related to prosodic features, prosodic features are introduced as speech unit selection criteria.

(B) AUTOMATIC TRAINING OF WEIGHTING COEFFICIENTS FOR ACOUSTIC AND PROSODIC FEATURE PARAMETERS

How much various feature quantities such as phonemic environments, acoustic features and prosodic features contribute to the selection of the speech unit is automatically determined by making use of all the speech samples in the speech waveform database. Thus, a speech synthesizer apparatus incorporating corpus as the basis has been built up.

(C) DIRECT CONCATENATION OF SPEECH WAVEFORM SEGMENTS

Based on the above automatic training, an optimal speech sample is selected out of the large scale speech waveform database. Thus, an arbitrary speech synthesizer apparatus without using any signal processing has been built up.

(D) USE OF SPEECH WAVEFORM DATABASE AS EXTERNAL INFORMATION

The speech waveform database is treated fully as external information. Thus, a speech synthesizer apparatus replacing the speech waveform signal data stored simply in a CD-ROM or the like has been built up.

EXPERIMENTS

With the speech synthesizer apparatus of the present preferred embodiment, the inventors have so far conducted evaluations by various kinds of speech waveform databases including four languages. As has been well known to those skilled in the art, hitherto, it has been technically quite difficult to synthesize high quality speech by using speech of female speakers. However, the method of the present preferred embodiment has overcome differences in sex, age and the like. By now, for Japanese, synthesized speech of highest quality has been obtained with the use of a speech waveform database that contains a corpus that a young female speaker has read short stories. For German, synthesized speech using CD-ROM data of read aloud sentences to which prosodic labels and detailed phoneme labels have been imparted has been outputted. This indicates that the speech synthesizer apparatus of the present preferred embodiment, technically, can freely use various types of existing speech waveform signal data, other than speech waveform signal data specially recorded for use of speech synthesis. Also, for English language, best speech quality has been obtained with 45 minute speech waveform signal data of a radio announcer in the news corpus of the Boston University. For Korean language, read aloud speech of short stories have been used.

According to the present preferred embodiments of the present invention, any arbitrary phoneme sequence can be converted into uttered speech without using any prosodic control rule or executing any signal processing. Still further, voice quality close to the natural one can be obtained, as compared with that of the conventional apparatus.

In another aspect of the present preferred embodiments of the present invention, the speech analyzing means may preferably comprise phoneme predicting means for predicting a phoneme sequence corresponding to an input speech waveform signal based on the input speech waveform signal. Accordingly, since there is no need of giving a phoneme sequence beforehand, the part of manual work can be simplified.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A speech synthesizer apparatus comprising:
   first storage means for storing speech segments of speech waveform signals of natural utterance;
   speech analyzing means, based on the speech segments of the speech waveform signals stored in said first storage means and a phoneme sequence corresponding to the speech waveform signals, for extracting and outputting index information on each phoneme of the speech waveform signals, first acoustic feature parameters of each phoneme indicated by the index information, and prosodic feature parameters for each phoneme indicated by the index information;
   second storage means for storing the index information, the first acoustic feature parameters, and the prosodic feature parameters outputted from said speech analyzing means;
   weighting coefficient training means for calculating acoustic distances in second acoustic feature parameters between one target phoneme from the same phonemic kind and the phoneme candidates other than the target phoneme based on the first acoustic feature parameters and the prosodic feature parameters which are stored in said second storage means, and for determining weighting coefficient vectors for respective target phonemes defining degrees of contribution to the second acoustic feature parameters for respective phoneme candidates by executing a predetermined statistical analysis for each of the second acoustic feature parameters for respective phoneme candidates based on the calculated acoustic distances;
   third storage means for storing weighting coefficient vectors for the respective target phonemes determined by the weighting coefficient training means;
   speech unit selecting means, based on the weighting coefficient vectors for the respective target phonemes stored in said third storage means, and the prosodic feature parameters stored in said second storage means, for searching for a combination of phoneme candidates which correspond to a phoneme sequence of an input sentence and which minimizes a cost including a target cost representing approximate costs between a target phoneme and the phoneme candidates and a concatenation cost repenting approximate costs between two phoneme candidates and a concatenation cost representing approximate costs been two phoneme candidates to be adjacently concatenated, and for outputting index information on the searched out combination of phoneme candidates, said target cost being represented by either one of a predetermined non-linear multiplication and a predetermined non-linear combination, with use of predetermined suitability functions each of fuzzy membership function, said concatenation cost being represented by either one of another predetermined non-linear multiplication and another predetermined non-linear combination with use of another predetermined suitability functions each of fuzzy membership function; and
   speech synthesizing means for synthesizing and outputting a speech signal corresponding to the input phoneme sequence by sequentially reading out speech segments of speech waveform signals corresponding to the index information from said first storage means based on the index information outputted from said unit selecting means, and by concatenating the read-out speech segments of the speech waveform signals.

2. The speech synthesizer apparatus as claimed in claim 1, wherein said speech analyzing means comprises phoneme predicting means for predicting a phoneme sequence corresponding to the speech waveform signals based on input speech waveform signals.

3. The speech synthesizer apparatus as claimed in claim 1, wherein said weighting coefficient training means determines the weighting coefficient vectors for the respective target phonemes representing the degrees of contribution to the second acoustic feature parameters for the respective phoneme candidates, by extracting a plurality of best top N1 phoneme candidates based on the calculated acoustic distances, and by executing a linear regression analysis for each of the second acoustic feature parameters.

4. The speech synthesizer apparatus as claimed in claim 2, wherein said weighting coefficient training means determines the weighting coefficient vectors for the respective target phonemes representing the degrees of contribution to the second acoustic feature parameters for the respective phoneme candidates, by extracting a plurality of best top N1 phoneme candidates based on the calculated acoustic distances, and by executing a linear regression analysis for each of the second acoustic feature parameters.

5. The speech synthesizer apparatus as claimed in claim 1, wherein said weighting coefficient training means determines the weighting coefficient vectors for the respective target phonemes representing the degrees of contribution to the second acoustic feature parameters for the respective phoneme candidates, by extracting a plurality of best top N1 phoneme candidates based on the calculated acoustic distances, and by executing a statistical analysis using a predetermined neural network for each of the second acoustic feature parameters.

6. The speech synthesizer apparatus as claimed in claim 2, wherein said weighting coefficient training means determines the weighting coefficient vectors for the respective target phonemes representing the degrees of contribution to the second acoustic feature parameters for the respective phoneme candidates, by extracting a plurality of best top N1 phoneme candidates based on the calculated acoustic distances, and by executing a statistical analysis for each of the second acoustic feature parameters.

7. The speech synthesizer apparatus as claimed in claim 1, wherein said speech unit selecting means extracts a plurality of top N2 phoneme candidates that are best in terms of the cost including the target cost and the concatenation cost, and thereafter, searches for a combination of phoneme candidates that minimizes the cost.

8. The speech synthesizer apparatus as claimed in claim 2, wherein said speech unit selecting means extracts a plurality of top N2 phoneme candidates that are best in terms of the cost including the target cost and the concatenation cost, and thereafter, searches for a combination of phoneme candidates that minimizes the cost.

9. The speech synthesizer apparatus as claimed in claim 3, wherein said speech unit selecting means extracts a plurality of top N2 phoneme candidates that are best in terms of the cost including the target cost and the concatenation cost, and thereafter, searches for a combination of phoneme candidates that minimizes the cost.

10. The speech synthesizer apparatus as claimed in claim 1, wherein the first acoustic feature parameters include cepstrum coefficients, delta cepstrum coefficients and phoneme labels.

11. The speech synthesizer apparatus as claimed in claim 3, wherein the first acoustic feature parameters include cepstrum coefficients, delta cepstrum coefficients and phoneme labels.

12. The speech synthesizer apparatus as claimed in claim 7, wherein the first acoustic feature parameters include cepstrum coefficients, delta cepstrum coefficients and phoneme labels.

13. The speech synthesizer apparatus as claimed in claim 1, wherein the first acoustic feature parameters include formant parameters and voice source parameters.

14. The speech synthesizer apparatus as claimed in claim 3, wherein the first acoustic feature parameters include formant parameters and voice source parameters.

15. The speech synthesizer apparatus as claimed in claim 7, wherein the first acoustic feature parameters include formant parameters and voice source parameters.

16. The speech synthesizer apparatus as claimed in claim 1, wherein the prosodic feature parameters include phoneme durations, speech fundamental frequencies $F_0$, and powers.

17. The speech synthesizer apparatus as claimed in claim 3, wherein the prosodic feature parameters include phoneme durations, speech fundamental frequencies $F_0$, and powers.

18. The speech synthesizer apparatus as claimed in claim 7, wherein the prosodic feature parameters include phoneme durations, speech fundamental frequencies $F_0$, and powers.

19. The speech synthesizer apparatus as claimed in claim 1, wherein the second acoustic feature parameters include cepstral distances.

20. The speech synthesizer apparatus as claimed in claim 3, wherein the second acoustic feature parameters include cepstral distances.

21. The speech synthesizer apparatus as claimed in claim 7, wherein the second acoustic feature parameters include cepstral distances.

22. The speech synthesizer apparatus as claimed in claim 1, wherein said concatenation cost C is represented by the following equation:

$$C = \Pi\, S_1 + \Pi\, S_2$$

wherein $S_1$ is a predetermined suitability function for target cost, and $S_2$ is a predetermined suitability function for joint cost.

23. The speech synthesizer apparatus as claimed in claim 1, wherein said concatenation cost C is represented by the following equation:

$$C = \Sigma S_1 + \Sigma S_2$$

where $S_1$ is a predetermined suitability function for target cost, and $S_2$ is a predetermined suitability function for joint cost.

* * * * *

UNITED STATES PATENT AND TRADEMARK OFFICE
CERTIFICATE OF CORRECTION

PATENT NO.      : 6,366,883 B1
DATED           : April 2, 2002
INVENTOR(S)     : Nick Campbell et al.

It is certified that error appears in the above-identified patent and that said Letters Patent is hereby corrected as shown below:

<u>Title page, Item [54] and Column 1, lines 1-2,</u>
Correct the title from "CONCATENATION OF SPEECH SEGMENTS BY USE OF A SPEECH SYNTHESIZER" to -- SPEECH SYNTHESIS FROM PHONEME SEQUENCE BY MINIMIZING TARGET AND CONCATENATION COSTS OF SPEECH UNIT COMBINATIONS, USING PREDETERMINED FUZZY MEMBERSHIP FUNCTIONS --.

Signed and Sealed this

Eighth Day of October, 2002

*Attest:*

*Attesting Officer*

JAMES E. ROGAN
*Director of the United States Patent and Trademark Office*